United States Patent Office 3,362,002
Patented Jan. 2, 1968

3,362,002
INDUCTIVE MEASURING DEVICE HAVING A CONDUCTIVE SHIELD
František Sedlák, Topolcany, and Bohdan Carniol and Antonín Pelc, Prague, Czechoslovakia, assignors to Tesla, narodni podnik, Prague, Czechoslovakia
Filed Dec. 1, 1965, Ser. No. 510,801
8 Claims. (Cl. 336—87)

ABSTRACT OF THE DISCLOSURE

A non-magnetic metal shield having good electrical conductivity surrounds a measuring coil and extends at least as far as the center of the measuring coil. The shield is open on the side facing a measured object. The maximum diameter of the shield is equal to five diameters of the measuring coil. The shield has a wall which is larger in thickness than three times the penetration depth of the electromagnetic field of the measuring coil due to skin effect. A ferromagnetic ring may be located in the gap between the shield and the measuring coil.

---

Figure 1:
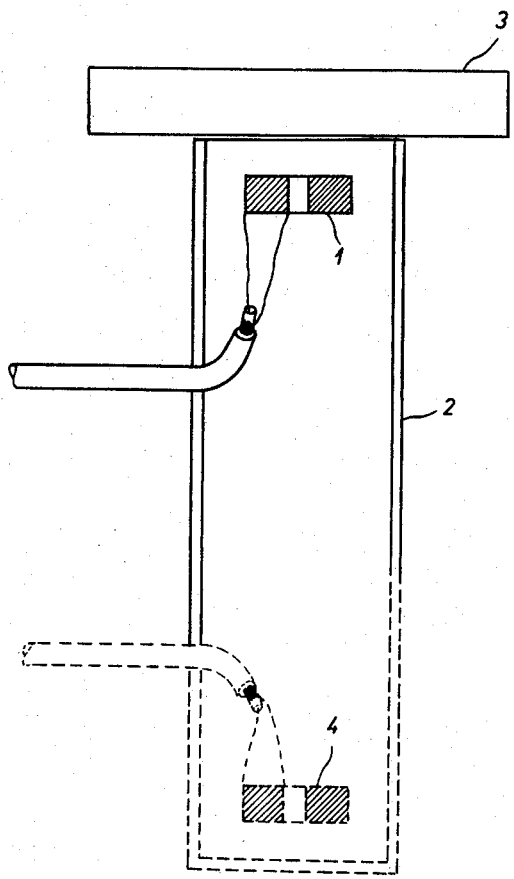

The invention relates to an inductive measuring device comprising a coil for measuring certain parameters of an electrically conductive object, such as for example the electric resistance, thickness and other dimensions, or the distance of an electrically conductive object from the measuring coil.

It is often necessary to employ non-destructive and contactless measurements of some parameters of an object made from an electrically conductive material by means of eddy currents. The measured object is in proximity with a measuring coil through which flows alternating current of a certain frequency. This current induces in the measured object eddy currents which affect the impedance of the measuring coil. By measuring these impedance changes it is possible to measure some parameters of the measured object, such as for example its electric resistance, thickness, and the like, or the distance of this object from the measuring coil.

The measuring process can be substantially improved by combining the measuring coil with a capacitor to form a resonant circuit and then measuring the change in the damping of this tuned LC circuit in dependence on the mentioned parameters of the measured object in proximity with the measuring circuit. For such measurement the tuned LC circuit should have a small damping, that is a high quality factor.

To make possible detailed measurement for example of the thickness of an area, the device should have a high areal resolving power, that is it should give a discrete measuring result from any small partial area of the measured area. To obtain small partial measuring areas, and thus also a high resolving power, the employed measuring coil is kept as small as possible. But the reduction of the partial measuring area to be employed for this purpose is limited due to the fact that with a given measuring frequency the dimensions of the measuring coil cannot be reduced below a certain limit without substantially reducing the quality factor of the tuned LC circuit, and this would reduce the sensitivity of the measurement.

Another factor which makes difficult sensitive measurement of the mentioned parameters from the changes of the damping of the tuned LC circuit is the change in the temperature of the measuring coil during measurement. This results in a disturbing change in the quality factor of the LC circuit which cannot be eliminated by currently employed methods using two coils due to the fact that the ambient temperature is different for each of the two coils.

It is a general object of the invention to provide an inductive measuring device of the mentioned type which allows an effective reduction of the necessary partial area, that is a substantial increase in the resolving power of the device without noticeable deterioration in the damping of the measuring coil.

Another object of the invention is to improve the possibility of compensating for the thermal changes of the measuring coil.

The device in accordance with the invention increases the resolving power of the measuring coil by narrowing the range of its electromagnetic field. This electromagnetic field is concentrated in a smaller partial area unit without noticeably worsening the damping of the coil. The electromagnetic field of the coil can be concentrated in a smaller partial areal unit by means of a metal screening cover of good electrical conductivity. If the cover is open in the direction of the measured object, the latter can be measured with a higher resolving power than without the screening.

Suitable materials for the screening cover are for example silver, copper, and aluminum. The thickness of the wall of the screening cover should be larger than three times the depth of penetration of the electromagnetic field due to skin effect. Such a screening affects predominantly the inductance of the coil and only to a small extent its quality factor. It is therefore possible to design coils and tuned LC circuits with a sufficiently high quality factor even if the screening cover surrounds the coil very closely.

It is also possible to obtain thermal compensation using a compensating coil in the same thickwalled screen of a good electrically conductive material which is also a good thermal conductor. The ambient temperature of the two coils is therefore practically balanced.

Stated briefly but more specifically the inductive measuring device in accordance with the invention for measuring certain parameters of an electrically conductive object, such as for example the electric resistance, thickness, and other dimensions, or the distance of an electrically conductive object from the measuring coil, comprising a measuring coil in a metal screening cover with good electrical conductivity, is characterized by the fact that the screening cover which is open on the side facing the measured object extends or is extensible at least as far as a plane through the center of the measuring coil and perpendicular to the axis of the screening cover, and that the diameter of the screening cover equals as a maximum five measuring coil diameters, and that the thickness of the cover wall is larger than three times the penetration depth of the electromagnetic field of the measuring coil due to skin effect.

Figure 2:
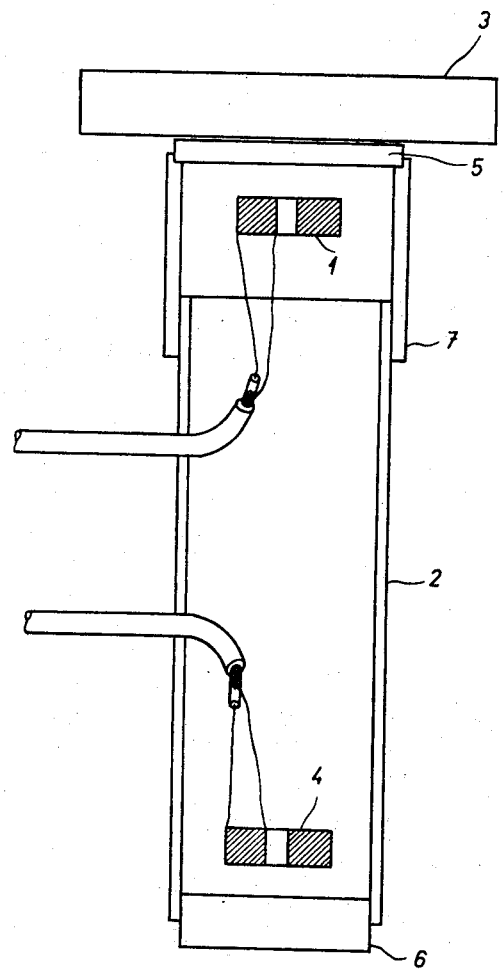
Figure 3:
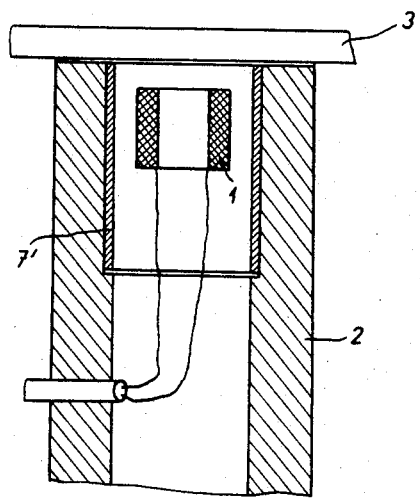

The invention will be best understood from the following specification to be read in conjunction with the accompanying drawings in which:

FIG. 1 explains the fundamental feature of the invention;

FIG. 2 shows an improvement over the fundamental device; and FIG. 3 shows another improvement.

Referring now more particularly to FIG. 1, the inductive measuring device in accordance with the invention comprises a measuring coil 1 located coaxially in a screening cover or shield 2 which is made from a metal with good electrical conductivity having a wall thickness which is larger than three times the penetration depth. The screening cover 2 is open on the side facing an object 3 to be measured and extends at least as far as the plane through the center of the coil and perpendicular to the axis of the cover, and preferably as far as the measured object. The gap between the cover and the coil is kept as small as possible and as far as the quality factor allows. In the case of a cylindrical coil and cover, and if the thickness of the cover is much larger than three times the penetration depth, it is possible to obtain without a noticeable loss in the quality factor a screening diameter below the value of five times the diameter of the measuring coil. Due to this screening cover only part of the measured object 3 lying within the area limited by the screening cover participates in the losses due to eddy currents. It has been found under actual conditions that the device will effectively operate even if the distance of the screening cover from the coil is less than double the diameter of the measuring coil.

The good thermal conductivity of the conductive screening cover assists also in keeping the reference coil 4 and the measuring coil 1 at the same temperature.

FIG. 2 shows an improvement in which the measuring side of the screening cover is terminated by an additional plate 5 made from a metal foil of a defined thickness approaching the so-called critical value. A ringlike member 7 serves as an adjustable extension of the cover or shield 2. The ring 7 is adjustably connected to the cover so that the length of the cover can by means of the ring 7 be adjusted to the required value. It is known that measurement of thickness or electrical resistance from the change in the damping of a tuned LC circuit which is inductively coupled with a measured circuit results in two possible readings, that is the same damping occurs for two values of thickness or resistance, the two values lying on both sides of the critical value of the thickness or resistance. By using the mentioned additional plate, the ambiguity of the measurement can be eliminated as has been proved elsewhere.

Practical tests were carried out using a copper cover with an internal diameter 18 mm., a wall thickness 2 mm. and a measuring frequency approx. 500 kc. The additional plate corresponding to 5 in FIG. 2 was made by evaporating a layer of aluminum of thickness 5 $\mu$m. upon a glass plate having a thickness 1 mm. and a diameter 18 mm. Protection of this layer against abrasive wear is achieved by cementing a similar second glass plate to the first one by means of Canada balsam. The additional coil is cemented into the device.

A considerable increase in the resolving power is achieved because the minimal diameter of the active measuring surface can be reduced from 40 mm. (without the cover) to 16 mm. (with the cover). The device gives also a more constant indication over a longer period and better accuracy and sensitivity by using a more sensitive moving coil instrument. On the side of the reference coil the screening can be terminated by a cylindrical damping member 6 of stainless steel. Its distance from the reference coil can be changed by screwing, and the damping power of the damping member can thus be adjusted to a value necessary with respect to the damping of the measuring coil. Similarly, on the side of the measuring coil 1 the screening 2 may be terminated by a cylindrical member 7 which is threadedly engaged with said screening. The length of the screening 2, and therefore the distance between the measuring coil 1 and the measured object 3, may be varied as desired by rotation of the cylindrical member 7. The function of the measuring coil and of the reference coil may be interchanged in the device according to the invention, or both coils may be used as measuring coils and indicate the difference between objects associated wtih each of the two coils.

However, even if screening covers made from a material with a very good electrical conductivity are used, the quality factor drops to an inadmissibly low value if the cover is made very tight.

This drawback can be eliminated by inserting into the gap between the cover and the measuring coil a ferromagnetic or ferrite ring which effectively reduces the damping effect of the screening cover even if the cover is very close to the measuring coil.

By using this ring it was possible to further reduce the active diameter of the device to 8 mm. and to measure the specific resistance on many configurations where this has been impossible previously.

FIG. 3 illustrates the device with the ring 7'.

The measuring device in accordance with the invention can be further improved by the usual accessories of inductive pick-up devices, such as means for changing the distance of the measured object from the measuring coil, an auxiliary plate, another reference coil, and the like.

The screening ferrite ring need not be made from one piece; it may consist of two or more elementary parts.

The improvement achieved by the described device is important because a high resolving power is the key problem in many cases of inductive pick-up techniques, for example in the case of contactless measurement of the specific resistance of metal alloys which requires high-accuracy measurement even if the dimension of the measured objects are small and not constant.

What we claim is:

1. Inductive measuring device for measuring certain parameters of an electrically conductive measured object, such as for example the electric resistance, thickness, and other dimensions, or the distance of an electrically conductive measured object from the measuring coil, comprising:
    a measuring coil;
    a shield of non-magnetic metal with good electrical conductivity, having an axis, surrounding the said measuring coil and being at least extensible at least as far as a plane through the center of said coil and perpendicular to the axis of said shield, said shield having an opening on the side facing the measured object, said shield having a maximum diameter equal to five diameters of the said measuring coil, and said shield having a wall having a thickness larger than three times the penetration depth of the electromagnetic field of the measuring coil due to skin effect.

2. Inductive measuring device as claimed in claim 1, further comprising:
    a ring made of a material of a group having ferromagnetic and ferrite properties located in the gap between said shield and said measuring coil.

3. Inductive measuring device as claimed in claim 2, further comprising:
    a reference coil within said shield positioned a sufficient distance from said measuring coil to avoid inductive coupling with said measuring coil.

4. Inductive measuring device as claimed in claim 3, further comprising:
    means for adjusting the distance between said measuring coil and said measured object.

5. Inductive measuring device as claimed in claim 4, further comprising:
    an auxiliary plate at the open end of said shield.

6. Inductive device as claimed in claim 3, further comprising:
    a damping member for adjusting the quality factor and inductance of said measuring coil, said damping member located in said shield on the side of said reference coil.

7. Inductive device as claimed in claim 6, further comprising:
    means for adjusting the distance between said measuring coil and said measured object.

8. Inductive device as claimed in claim 7, further comprising:
    an auxiliary plate at the open end of said shield.

References Cited

UNITED STATES PATENTS

| 1,855,054 | 4/1932 | Johnson | 336—84 XR |
| 2,111,210 | 3/1938 | Ebel | 324—40 |
| 2,894,203 | 7/1959 | Cory | 324—40 |
| 3,061,774 | 10/1962 | Ryan | 324—40 XR |

FOREIGN PATENTS

| 875,567 | 8/1961 | Great Britain. |

LARAMIE E. ASKIN, *Primary Examiner.*

T. J. KOZMA, *Assistant Examiner.*